March 13, 1962 L. G. THOMPSON 3,025,501

MAGNETIC CORE LOGICAL SYSTEMS

Filed June 20, 1956

INVENTOR.
LYLE G. THOMPSON
BY Ralzemond B. Parker
ATTORNEY

United States Patent Office 3,025,501
Patented Mar. 13, 1962

3,025,501
MAGNETIC CORE LOGICAL SYSTEMS

Lyle G. Thompson, Broomall, Pa., assignor to Burroughs Corporation, Detroit, Mich., a corporation of Michigan Filed June 20, 1956, Ser. No. 592,583
4 Claims. (Cl. 340—174)

This invention relates to bistable state magnetic storage devices and more particularly to magnetic core logical systems.

Static magnetic storage elements are presently finding widespread application in the logical operations commonly associated with modern electronic computing equipment. The magnetic systems utilizing these storage elements have the advantages of small size, reliability, economy and longevity.

Magnetic storage elements in general are materials having substantially rectangular hysteresis characteristics wherein the storage elements tend to remain in a permanent magnetic remanence condition in response to the application thereto of a saturating magnetic flux. In general, the magnetic storage elements may be constructed in a number of geometries some including both closed and open paths. For example cup-shaped strips and toroidal-shaped cores are possible. The storage states of such elements may be determined at any time by providing an interrogation saturation flux of a known polarity to windings coupled to such elements. The interrogating flux source induces a large signal voltage pulse in transformer windings about a core when the remanence condition of such core is changed from one polarity to another. However, when the interrogating flux leaves the core in the same remanent condition, very little output signal is induced in such transformer windings about the core. Thus, the storage state is compared with the known polarity of the interrogating flux.

Binary magnetic storage elements are combined in numerous circuit configurations to perform logical operations. Certain combinations of these elements, although highly desirable from a theoretical standpoint, have been considered impractical due to the excessive loading which exists among these elements. This loading is the result of current flowing through the electrical paths common to the various magnetic elements and is a consequence of the transformer action hereinbefore described in connection with the switching of these elements. In circuit operation this loading may cause the loss of information being transferred from one element to another or may effect only a partial transfer of information with subsequent erroneous results. In some instances it may be possible to design the circuit to take into account this loading effect but even at best, the circuit operation is marginal, inefficient and difficult to reproduce in large systems with any degree of reliability.

This invention is directed to a particular type of system logic which prevents the excessive loading of the magnetic core output circuits without the need for special circuit design involving increased power requirements or additional unidirectional current devices.

In accordance with the present invention, a special inverted core logic is employed between certain cores in a conventional system of cores in such a manner that certain logical functions are obtained reliably and quickly and with a minimum number of circuit components.

It is therefore an object of the present invention to provide improved magnetic circuits for performing logical functions.

A more specific object of this invention is to provide an improved system of logical magnetic core circuits.

Another object of this invention is to provide improved combinations of logical circuits which are more reliable by virtue of their freedom from loading effects.

Other features and objects of the invention will be described throughout the following detailed description of the invention and illustrated in the accompanying drawings, in which.

Before proceeding with a detailed analysis of the circuit, it will be helpful to review the notation and background material used in connection with the schematic diagrams. Thus the information of opposite polarities to be stored in the binary elements is arbitrarily designated in the binary notation "1" and "0". The magnetic binary elements are shown as circles and it is assumed that these represent magnetic cores having essentially rectangular hysteresis loop characteristics. Although the magnetic elements are depicted as being toroidal in form, it is understood that the invention is not limited to elements of this particular geometry, but may include other forms of magnetic storage elements as hereinbefore mentioned.

Each of the magnetic cores is supplied with windings for producing a magnetic flux therein in response to current flow through these windings. A dot is placed at the end of each of these windings to indicate that that end has a negative polarity during read-in of a binary "1" and a positive polarity during read-out of a binary "1". Thus as current flows into the dotted winding terminal, the core associated with such winding will tend to store a "0". Conversely if the current flows into an undotted winding terminal, the core associated with such winding will tend to store a "1".

Figure 1:
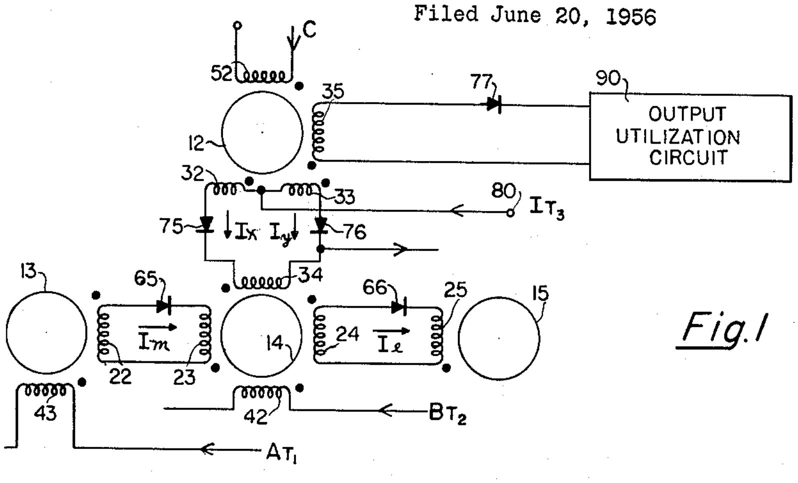
FIG. 1 illustrates a possible method of combining a conventional binary magnetic shift register and a split winding conditional transfer circuit in which the loading effect hereinbefore described is present.

Referring now to FIG. 1, consider the circuit operation when the system logic of the instant invention is not employed. Magnetic cores 13, 14 and 15 are part of a magnetic binary shift register in which the binary information to be stored is read in serially. The use of shift registers in electronic computing devices is well known in the art. The general principle of operation of such registers is discussed in an article by A. D. Booth entitled "An Electronic Digital Computer" published in "Electronic Engineering" for December 1950. Assume that magnetic core 13 is in the "1" remanent state and core 14 is in the "0" state as a result of a previous transfer. The application of an advance current pulse A at a first time period $T_1$ to the dotted terminal of winding 43 reads the "1" out of element 13 and transfers it to magnetic element 14 via a single diode transfer loop including winding 22, diode 65, and winding 23. Although switching voltages are induced in windings 34 and 24 during the transfer of a "1" to core 14, there is negligible, if any current flow in the loops $I_x$—$I_y$ and $I_1$ because of diodes 76 and 66 respectively. Thus core 14 is unloaded during read in and the transfer of information from core 13 is effected with efficiency and reliability. Transfer by advance current pulse B at a time period $T_2$ may occur to read out element 14 into element 15.

Assume that at some predetermined time it is desired to read out the binary information stored in the register, such read out to be made in parallel. This read-out may be accomplished by a conditional transfer split winding associated with each of the information cores in the shift register. This split-winding transfer circuit is described and claimed in the copending application of John O. Paivinen, Serial No. 762,863, filed December 23, 1958, as a continuation of three earlier filed Paivinen applications, Serial Nos. 396,603; 396,605, filed December 7, 1953, and Serial No. 420,135, filed March 31, 1954, the last being a continuation-in-part of Paivinen application Serial No. 396,604, filed December 7, 1953, each of said Paivinen applications being assigned to the assignee of the present application. However, the split winding transfer circuit is described hereinafter to enable a full understanding of the present invention. Magnetic element 12, windings 32, 33 and 34, and diodes 75, 76 comprise such a transfer circuit. Magnetic element 12 is in the "0" remanent state as a result of current pulse C flowing through winding 52. The interrogation current, I, enters terminal 80 at a time period $T_3$ and divides into two branch currents $I_x$ and $I_y$. Current $I_x$ flows through winding 32, diode 75, winding 34 and thence back to the source. Current $I_y$ flows through winding 33, diode 76 and thence back to the current source.

Current $I_x$ flows into the dotted terminal of winding 34, thereby tending to switch magnetic core 14 toward the "0" state. As core 14 switches toward the "0" state, a counter E.M.F. is induced across winding 34 in accordance with Lenz's Law. The induced voltage is of such polarity as to oppose the flow of current $I_x$ and thereby results in a proportionate tendency for diminution of current $I_x$, and subsequent increase of current $I_y$.

Since current $I_y$ is larger than $I_x$, the M.M.F. applied to core 12 as a consequence of current $I_y$ flowing into the undotted terminal of winding 33 is sufficient to overcome the opposing M.M.F. applied to core 12 by the smaller current $I_x$ flowing through winding 32 and, consequently, magnetic core 12 is switched to the "1" state. As core 12 is switched to the "1" state a voltage is induced across winding 35 of such polarity that an output signal pulse is transmitted through diode 77 to the utilization circuit.

Figure 2:
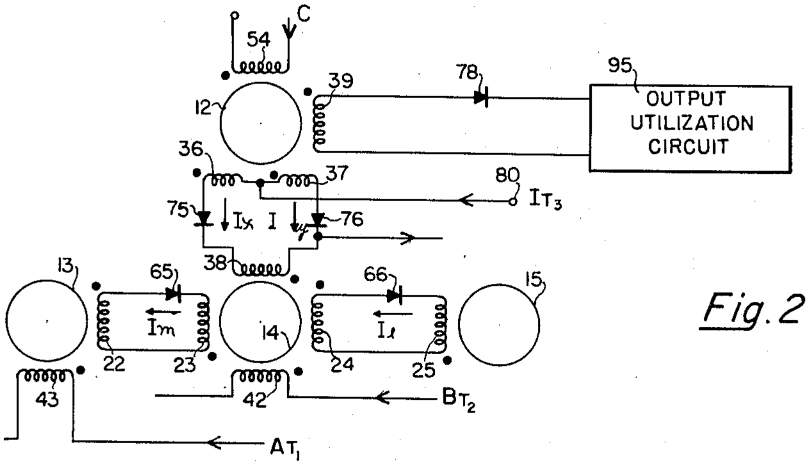
FIG. 2 illustrates the system logic of the instant invention as applied to the same combination of magnetic elements illustrated in FIG. 1.
Figure 3:
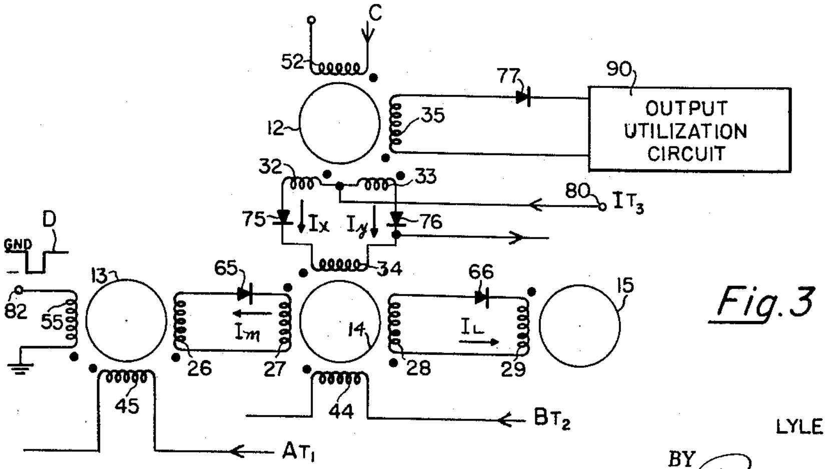
FIG. 3 illustrates another embodiment of the system logic of the instant invention.

The aforementioned loading problem manifests itself in the following manner. As core 14 is switched to the "0" state, a voltage is induced across winding 24 of such a polarity as to cause current $I_L$ to flow in a path comprising winding 24, diode 66 and winding 25. Likewise a voltage is induced across winding 23 of such a polarity to cause current $I_m$ to flow in a path comprising windings 23 and 22, and diode 65. The flow of currents $I_L$ and $I_m$ has two effects namely, it decreases the efficiency of the split winding transfer by requiring that a larger M.M.F. be applied to switch magnetic core 14 and a second more important effect is that currents $I_L$ and $I_m$ flowing into the undotted terminals of windings 25 and 23 respectively may cause the partial switching of cores 15 and 13 toward their "1" states. If cores 15 and 13 are also information cores being read-out in parallel simultaneously with core 14, the partial "1's" may be transmitted to the utilization circuit by transfer loops similar to those hereinbefore described. The presence of output pulses representative of the partial switching of the magnetic cores in the shift register, may result in errors in the system operation. FIGS. 2 and 3 are schematic diagrams of a serial read-in parallel read-out circuit similar to that in FIG. 1 but employing the inverse logic of the instant invention to eliminate circuit loading.

Consider the circuit operation of FIG. 2. Information is shifted serially into the register in exactly the same manner as described in connection with FIG. 1. The conditional transfer split winding circuit of FIG. 2 has been modified in accordance with the inverse logic of the instant invention. The polarities of all the windings associated with the split winding transfer loop, namely 36, 37, 38, 39 and 54 are the inverse of the corresponding windings of FIG. 1. Magnetic core 12 has been preset to the "1" state by current pulse C flowing through winding 54. Assume that a "1" has been transferred to magnetic core 14 at some time prior to the application of interrogation pulse I to terminal 80. Branch current $I_x$ flows into the undotted terminal of winding 38, and since magnetic core 14 is already in the "1" state current $I_x$ tends to drive the core further into the "1" state with no substantial counter E.M.F. being generated across winding 38.

Thus currents $I_x$ and $I_y$ flowing through windings 36 and 37 are substantially equal and the M.M.F.'s applied to magnetic core 12 are equal and opposite. Therefore core 12 remains in the "1" remanent state. Since core 12 is not switched to the "0" state there is no output to the utilization circuit.

If, however, core 14 contains a "0" at the time interrogating current $I_x$ tends to switch core 14 to the "1" state and due to the counter E.M.F. developed across winding 38 current $I_x$ is inhibited while there is a tendency for more current to flow in the $I_y$ branch. This increased current flowing into the dotted terminal of winding 37 applies sufficient M.M.F. to overcome the effect of current $I_x$ flowing through winding 36 and core 12 is switched to the "0" state. The switching of core 12 to the "0" state induces a voltage in winding 39 and an output pulse is supplied to the utilization circuit 95 via the diode 78.

The circuit of FIG. 2 is adapted to give the binary complement of the information stored in the register. The complement is useful in many arithmetic operations e.g. in binary subtraction. Thus when a "1" is contained in the register a "0" is transmitted to the utilization circuit during parallel read-out and a "0" in the register results in a pulse output or binary "1" to the utilization circuit.

In either case the inverse logic of the instant invention eliminates the loading described in connection with FIG. 1. Note that current $I_x$ tends to place core 14 in the "1" state under any condition. When core 14 is switched from the "0" state to the "1" state a voltage is developed across windings 23 and 24 but this voltage is of such polarity that diodes 65 and 66 prevent or allow only negligible currents $I_m$ and $I_L$ to flow in the loops. There can be no partial switching of magnetic cores 13 or 15 to their respective "1" states.

In FIG. 3 the inverse logic of the instant invention is applied to the magnetic shift register while the read-out split winding loop is the conventional type described in connection with FIG. 1. The polarities of all the windings associated with the shift register, namely 26, 27, 28, 29, 44 and 45 are the inverse of corresponding windings of FIG. 1. Prior to the serial read in of information into the register, all the cores are cleared to the "1" state by the advance currents represented schematically by A and B. This change in logic requires that a "0" be written or pulsed into the input of the shift register rather than "1's". For example, if the input to the shift register is derived from a flip-flop in which the lower D.C. level has been arbitrarily designated "0" in the particular system under consideration, and it is assumed that winding 55 of core 13 is the input winding of the register, the application of a negative pulse, D, to terminal 82 will read a "0" into core 13. As the "0" is transferred to core 14, diode 75 prevents the clockwise flow of current in the split winding loop and there is no loading present.

The parallel read-out is accomplished by the split-winding circuit described in connection with FIG. 1. If core 14 contains a "0," branch currents $I_x$ and $I_y$ are substantially equal; core 12 remains in its "0" remanent state and there is no output pulse delivered to the utilization circuit 96. On the other hand, if core 14 contains a "1," the unbalance in currents $I_x$ and $I_y$ causes core 12 to be switched to the "1" state and one output pulse representative of a binary "1" is delivered to the utilization circuit. Under either of these conditions, current $I_x$ tends to switch core 14 into the "0" state. As core 14 switches from the "1" to the "0" state, voltages are induced across windings 27 and 28, but currents $I_m$ and $I_L$ are prevented from flowing by diodes 65 and 66 respectively. Hence there is neither loading, nor partial transfer at any time in this circuit configuration.

From the foregoing description of the invention and its mode of operation, it is evident that an inverse logical system operating within a conventional system of logic may be advantageously applied to various combinations of binary magnetic elements. Therefore, while there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. Those features of novelty believed descriptive of the nature of the invention are therefore described with particularity in the appended claims.

What is claimed is:

1. A logical system comprising a plurality of magnetic elements each having two stable remanent conditions representative of the binary zero and one states, at least a first of said elements having a plurality of windings coupled thereto, first and second interrogation means coupled respectively to a pair of said windings, said first interrogation means being adapted to switch said first magnetic element from the zero state to its one state, said second interrogation means being adapted to switch said magnetic element from its one state to its zero state, second and third magnetic storage elements, separate transfer circuits coupling said second and third elements to said first element, each of said transfer circuits including at least one unidirectional current device, the switching of said first element by either said first or second interrogation means tending to cause switching current flow in each of said transfer circuits, said unidirectional current devices being so connected that switching current is allowed to flow in either one or the other of said transfer circuits but not concurrently in both circuits, thereby avoiding the loading down of one of said transfer circuits by the other during the switching of said magnetic element, said second and third magnetic elements being disposed to sense the flow of switching current in the respective transfer circuits in which they are connected.

2. A logical system comprising: a plurality of magnetic elements each having two stable remanent conditions representative of the binary zero and one states, a first of said elements having first and second interrogation windings and an output winding coupled thereto; first and second interrogation means coupled respectively to said first and second interrogation windings for causing current flow therethrough; said first interrogation means being adapted to switch said first magnetic element from the zero state to the one state; said second interrogation means being adapted to switch said first magnetic element from the one state to the zero state; second and third magnetic storage elements; an input winding coupled to each of said second and third magnetic elements; a first transfer circuit coupling said first magnetic element to said second magnetic element, said first transfer circuit comprising in series said output winding on said first magnetic element, a unidirectional current device, and said input winding on said second magnetic element; a second transfer circuit coupling said first magnetic element to said third magnetic element, said second transfer circuit comprising said first interrogation winding on said first magnetic element, a unidirectional current device, and said input winding on said third magnetic element; said unidirectional current device in said first transfer circuit being poled to inhibit the flow of current in said latter circuit when said first magnetic element is switched from the zero state to the one state, but poled to allow current flow therein when said first magnetic element is switched from the one state to the zero state; said unidirectional current device in said second transfer circuit being poled to inhibit the flow of current in said latter circuit when said first magnetic element is switched from the one state to the zero state, but poled to allow the flow of current therein when said first magnetic element is switched from the zero state to the one state; said unidirectional current devices allowing current to flow in either one or the other of said transfer circuits but not concurrently in both circuits, thereby avoiding the loading down of one of said transfer circuits by the other during the switching of said first magnetic element; said second and third magnetic elements being disposed to sense the flow of current in the respective transfer circuits in which they are coupled.

3. A logical system comprising: a plurality of magnetic elements each having two stable remanent conditions representative of the binary zero and one states, a first of said elements having first and second interrogation windings and an output winding coupled thereto; first and second interrogation means coupled respectively to said first and second interrogation windings for causing current flow therethrough; said first interrogation means being adapted to switch said first magnetic element from the zero state to the one state; said second interrogation means being adapted to switch said first magnetic element from the one state to the zero state; second and third magnetic storage elements; an input winding coupled to said second magnetic element; a tapped winding having a pair of end terminals and being coupled to said third magnetic element; a first transfer loop coupling said first magnetic element to said second magnetic element; said first transfer loop comprising in series said output winding on said first magnetic element, a unidirectional current device, and said input winding on said second magnetic element; a second transfer loop coupling said first magnetic element to said third magnetic element, said second transfer loop comprising said first interrogation winding on said first magnetic element, said tapped winding on said third magnetic element, and a pair of unidirectional current conducting devices each having first and second electrodes; said first electrodes being connected respectively to opposite ends of said first interrogation winding, said second electrodes being connected respectively to the end terminals of said tapped winding; said first interrogation means including circuit means for connecting a source of current between the tap on said tapped winding and a point on said second transfer loop located between said pair of unidirectional current devices, thereby to establish parallel current flow paths between said first magnetic element and said third magnetic element; said unidirectional current device in said first transfer loop being poled to inhibit the transfer of energy from said first to said second magnetic element when said first magnetic element is switched from the zero state to the one state by said first interrogation means, but poled to permit the transfer of energy therebetween when said first magnetic element is switched from the one state to the zero state by said second interrogation means; at least one of said unidirectional current devices in said second transfer loop being poled to inhibit the transfer of energy from said first magnetic element to said third magnetic element when said first magnetic element is switched from the one state to the zero state by said second interrogation means, but poled to allow the transfer of energy therebetween when said first magnetic element is switched from the zero state to the one state by said first interrogation means; said switching energy being transferred from said first to said second magnetic element and from said first to said third magnetic element in response to said second and first interrogation means respectively but not transferred from said first element to said second and third elements concurrently, thereby avoiding the loading down of one of said transfer circuits by the other during the switching of said first magnetic element; said second and third magnetic elements being disposed to sense the transfer of switching energy in the respective transfer circuits in which they are coupled.

4. A logical system comprising: a plurality of magnetic elements each having two stable remanent conditions representative of the binary zero and one states, a first of said elements having first and second interrogation windings and an output winding coupled thereto; first and second interrogation means coupled respectively to said first and second interrogation windings for causing current flow therethrough; said first interrogation means being adapted to switch said first magnetic element from the zero state to the one state; said second interrogation means being adapted to switch said first magnetic element from the one state to the zero state; second and third magnetic storage elements; an input winding coupled to said second magnetic element; a tapped winding having a pair of end terminals, a preset winding, and an output winding coupled respectively to said third magnetic element; a first transfer loop coupling said first magnetic element to said second magnetic element, said first transfer loop comprising in series said output winding on said first magnetic element, a diode, and said input winding on said second magnetic element; a second transfer loop coupling said first magnetic element to said third magnetic element, said second transfer loop comprising said first interrogation winding on said first magnetic element, said tapped winding on said third magnetic element, and a pair of diodes each having first and second electrodes; said first electrodes being connected respectively to opposite ends of said first interrogation winding, said second electrodes being connected respectively to the end terminals of said tapped winding; said first interrogation means including circuit means for connecting a source of current between the tap on said tapped winding and a point on said second transfer loop located between said pair of diodes, thereby to establish parallel current flow paths between said first magnetic element and said third magnetic element; said diode in said first transfer loop being poled to inhibit the transfer of switching energy from said first to said second magnetic elements when said first magnetic element is switched from the zero state to the one state, but poled to permit the transfer of energy therebetween when said first magnetic element is switched from the one state to the zero state; at least one of said diodes in said second transfer loop being poled to inhibit the transfer of energy from said first magnetic element to said third magnetic element when said first magnetic element is switched from the one state to the zero state, but poled to allow the transfer of energy therebetween when said first magnetic element is switched from the zero state to the one state; said second magnetic element being switched from the zero state to the one state in response to the switching of said first magnetic element from the one state to the zero state; said preset winding on said third magnetic element being adapted to be pulsed from a source of current whereby said latter element is preset to the one state, said third magnetic element being switched from the one state to the zero state in response to the switching of said first magnetic element from the zero state to the one state; and means for utilizing the switching voltage developed across said output winding on said third magnetic element when said latter element is switched from the preset one state to the zero state.

References Cited in the file of this patent

UNITED STATES PATENTS

| | | |
|---|---|---|
| 2,540,654 | Cohen et al. | Feb. 6, 1951 |
| 2,719,773 | Karnaugh | Oct. 4, 1955 |
| 2,741,758 | Cray | Apr. 10, 1956 |
| 2,849,703 | Bindon et al. | Aug. 26, 1958 |
| 2,857,586 | Wylen | Oct. 21, 1958 |
| 2,943,301 | Loev et al. | June 28, 1960 |
| 2,952,007 | Meyerhoff et al. | Sept. 6, 1960 |

OTHER REFERENCES

"Magnetic Elements in Arithmetic and Control Circuits," by I. L. Auerbach and S. B. Disson, published in "Electrical Engineering," September 1955, pp. 766–770.

"Magnetic Core Circuits for Digital Data-Processing Systems," by D. Loev et al., published in "Proceedings of IRE," February 1956, pp. 154–162.